April 23, 1957 E. NYYSSONEN 2,790,130
POLYPHASE TRANSFORMER PHASE CONVERTER SYSTEM
Filed Nov. 10, 1953 7 Sheets-Sheet 1

INVENTOR.
Einard Nyyssonen

April 23, 1957     E. NYSSONEN     2,790,130
POLYPHASE TRANSFORMER PHASE CONVERTER SYSTEM
Filed Nov. 10, 1953     7 Sheets-Sheet 3

INVENTOR.
Einard Nyyssonen

April 23, 1957   E. NYYSSONEN   2,790,130
POLYPHASE TRANSFORMER PHASE CONVERTER SYSTEM
Filed Nov. 10, 1953   7 Sheets-Sheet 6
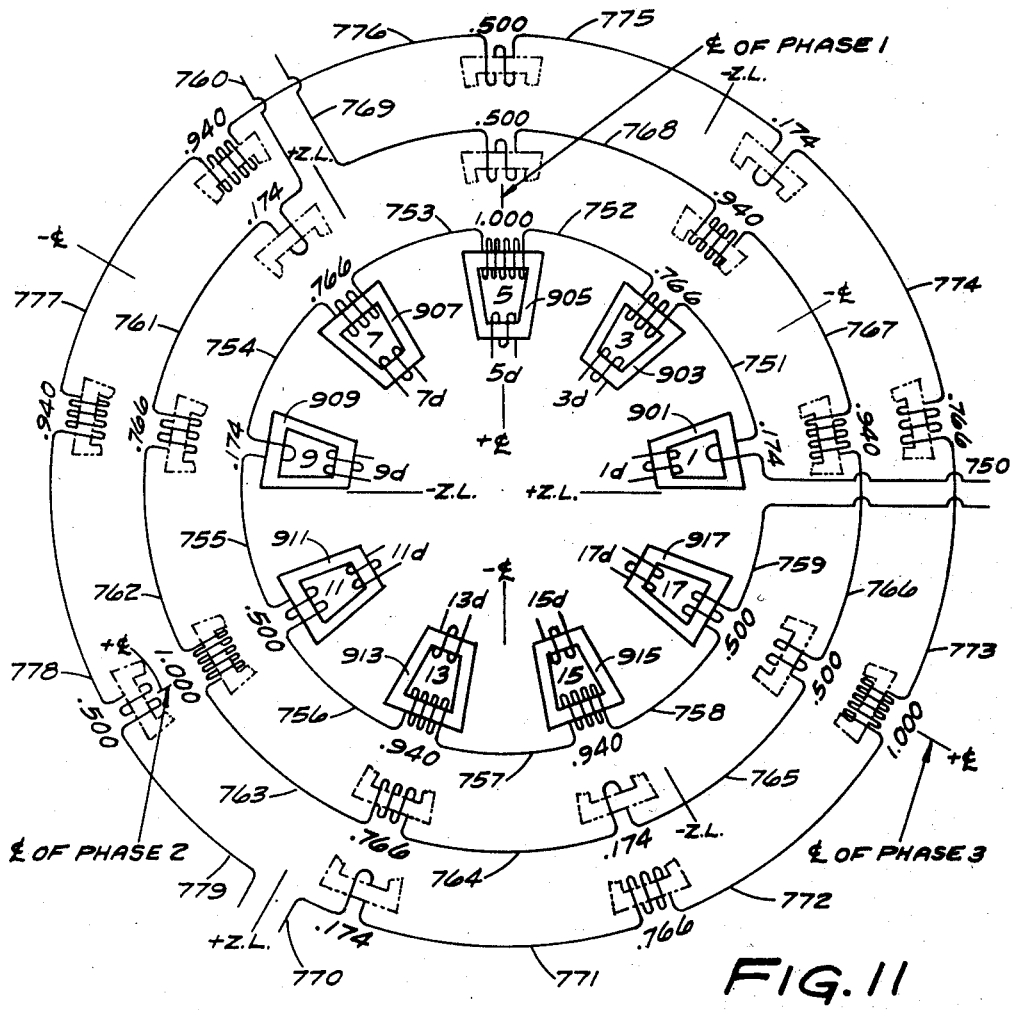
FIG. 11
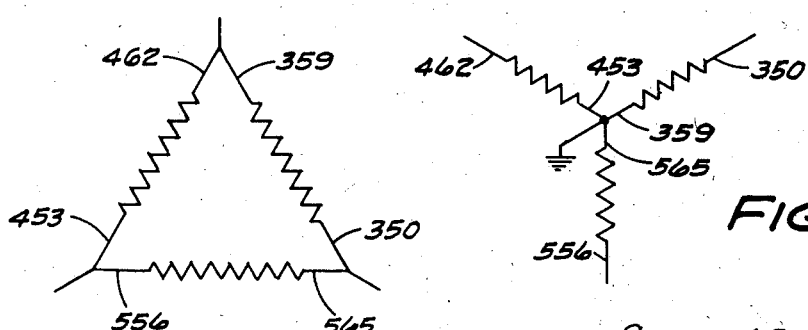
FIG. 13
FIG. 12
INVENTOR.
Einard Nyyssonen April 23, 1957  E. NYYSSONEN  2,790,130
POLYPHASE TRANSFORMER PHASE CONVERTER SYSTEM
Filed Nov. 10, 1953

INVENTOR.
Einard Nyyssonen

United States Patent Office 2,790,130
Patented Apr. 23, 1957

2,790,130

POLYPHASE TRANSFORMER PHASE CONVERTER SYSTEM

Einard Nyyssonen, Watertown, Mass.

Application November 10, 1953, Serial No. 391,165

22 Claims. (Cl. 321—57)

The present invention relates to polyphase transformer systems.

An object of the invention is to provide a new and improved transformer system, having magnetic circuits of the same polarity, that shall effect a transformation between a polyphase electric system of a large number of phases, which may or may not be sinusoidal, and a polyphase electric system, usually of a lesser number of substantially sinusoidal phases.

Another object of the present invention is to provide a new and improved transformer system, similarly provided with magnetic circuits of the same polarity, that shall effect a transformation between two polyphase electric systems each of a large number of phases which may or may not be sinusoidal.

A further object of the present invention is to effect cancellation of detrimentally operating harmonics, particularly harmonics above the third.

Other and further objects will be explained hereinafter and will be more particularly pointed out in the appended claims.

Figure 1:
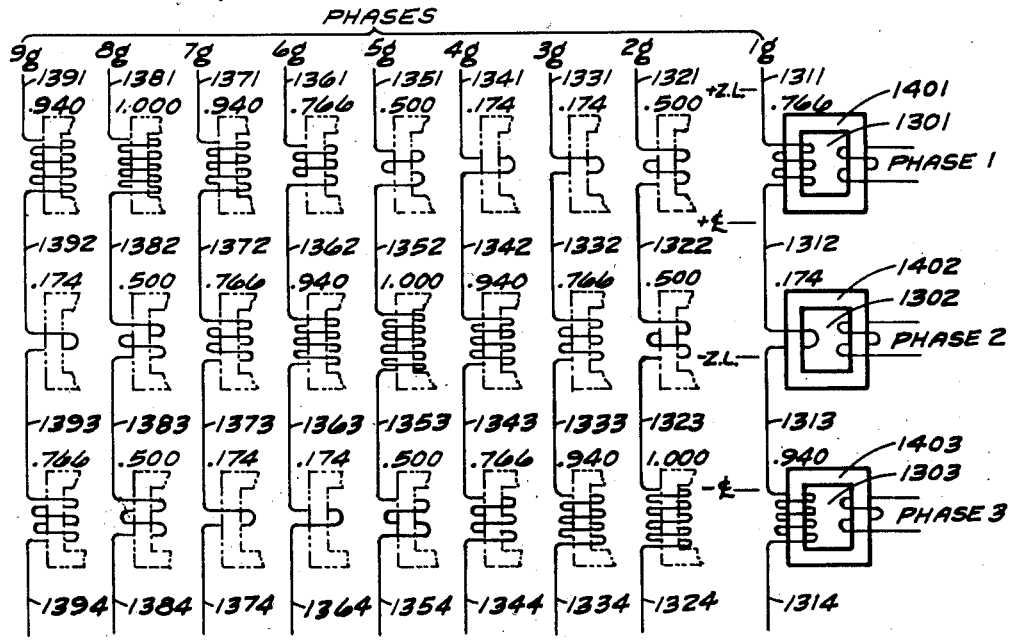
Figure 2:
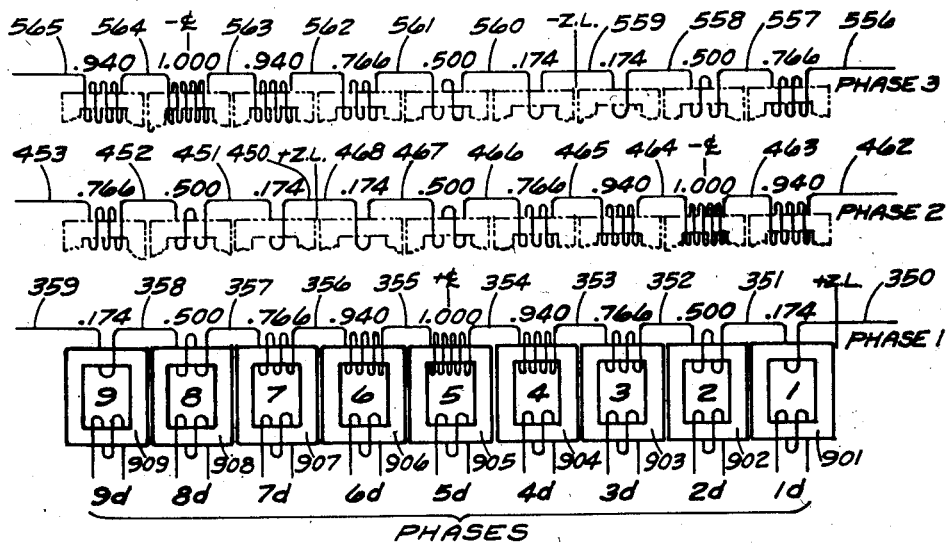
Figure 3:
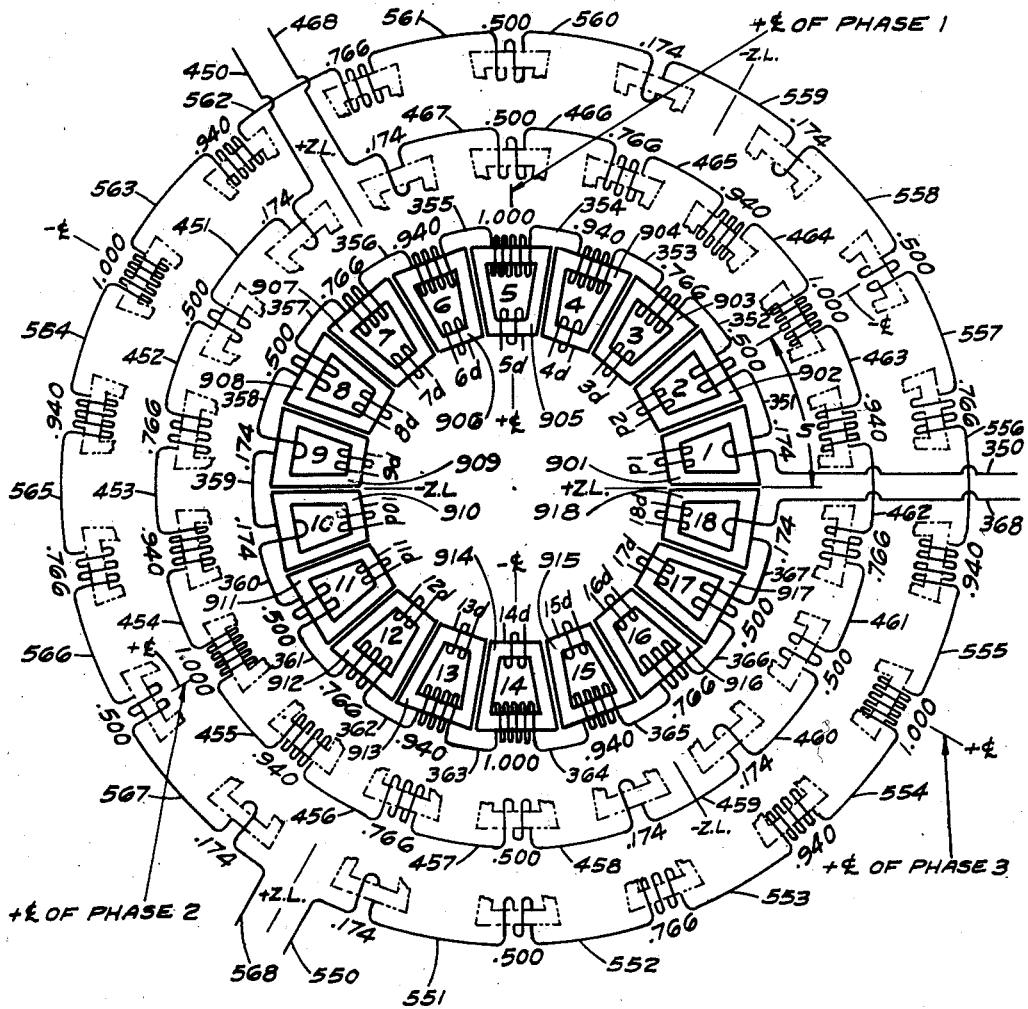
Figure 5:
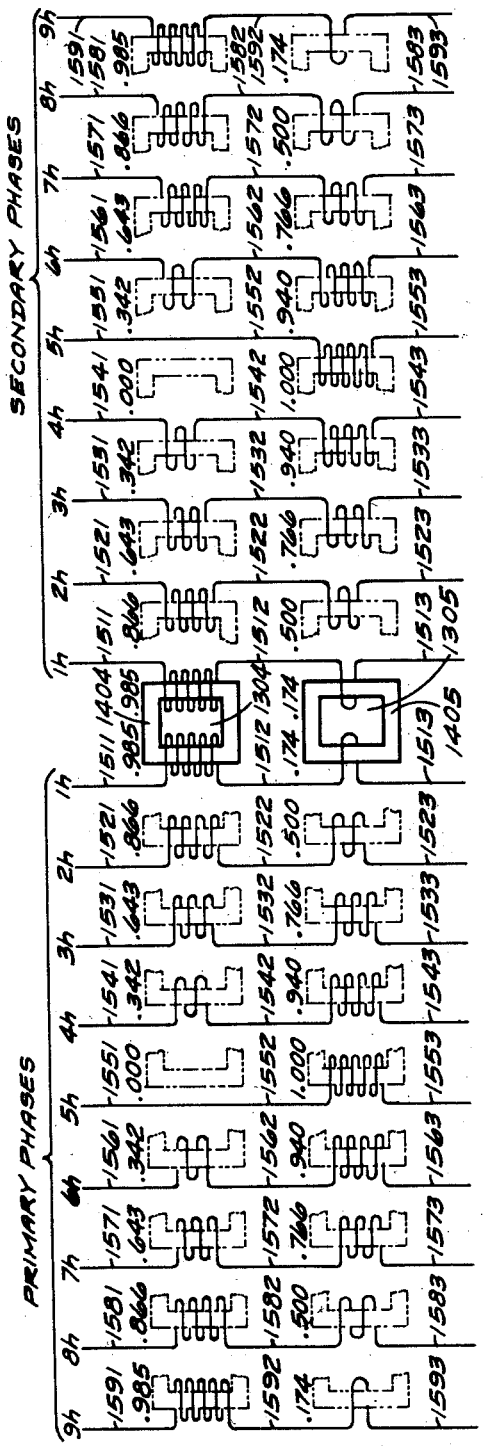
Figure 4:
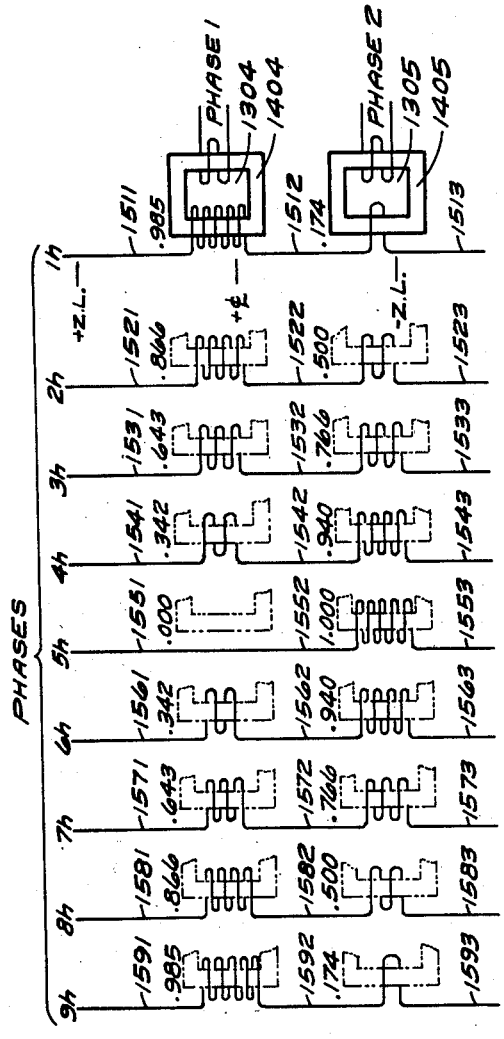
Figure 6:
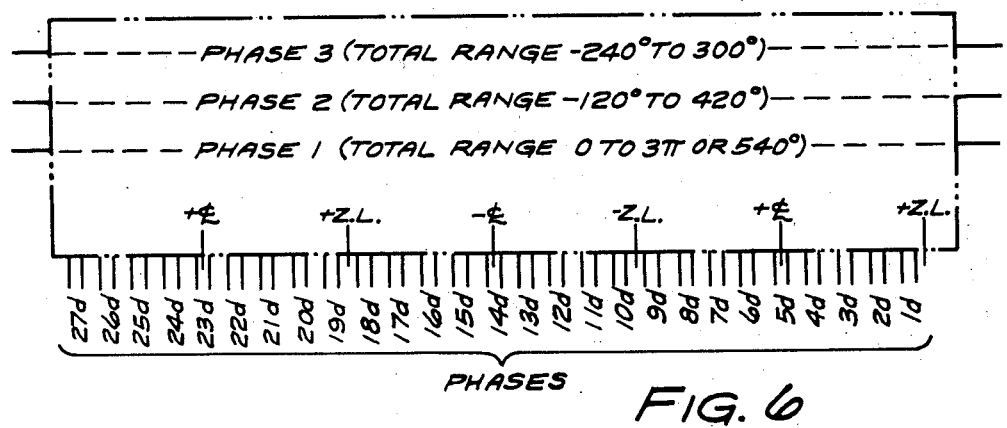
Figure 7:
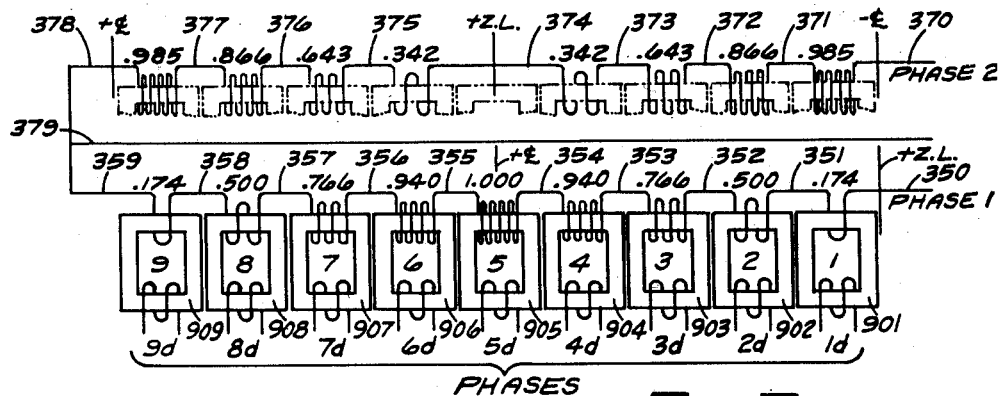
Figure 8:
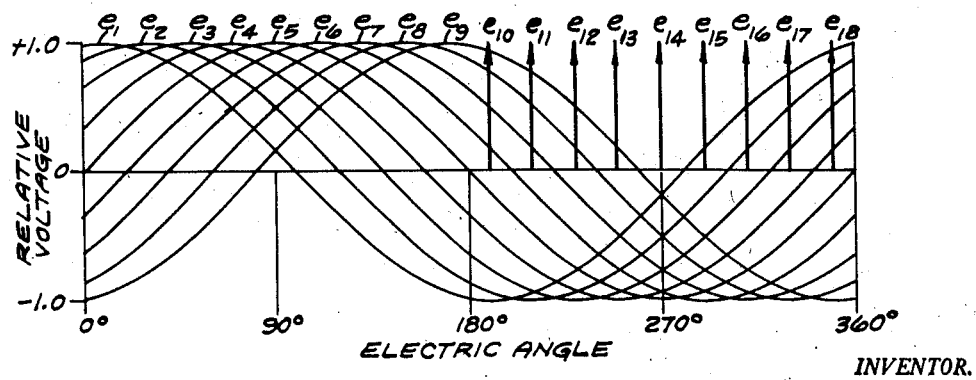
Figure 9:
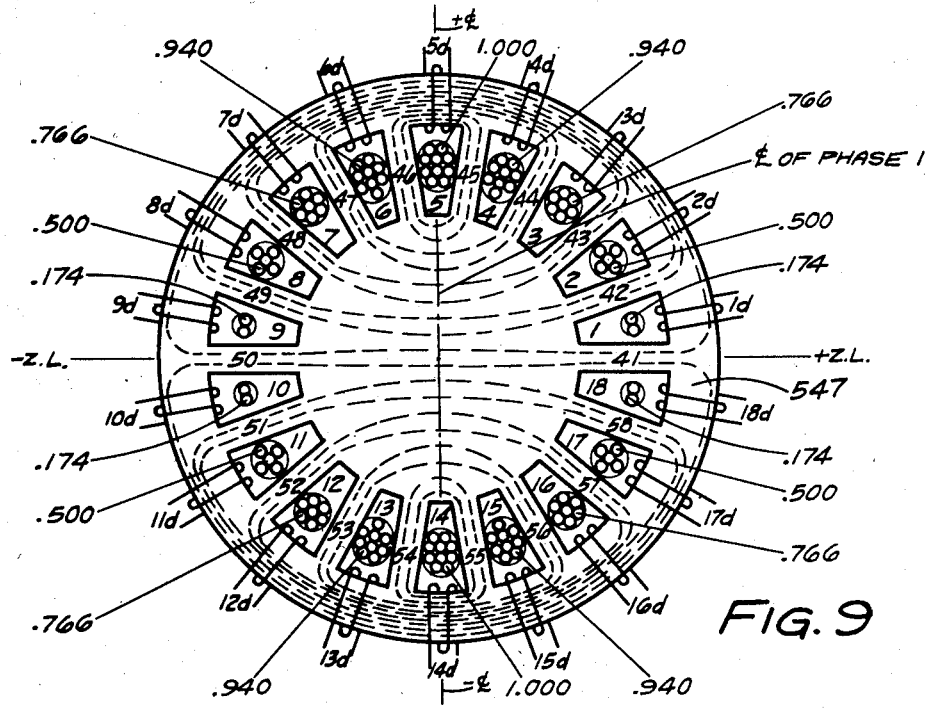
Figure 10:
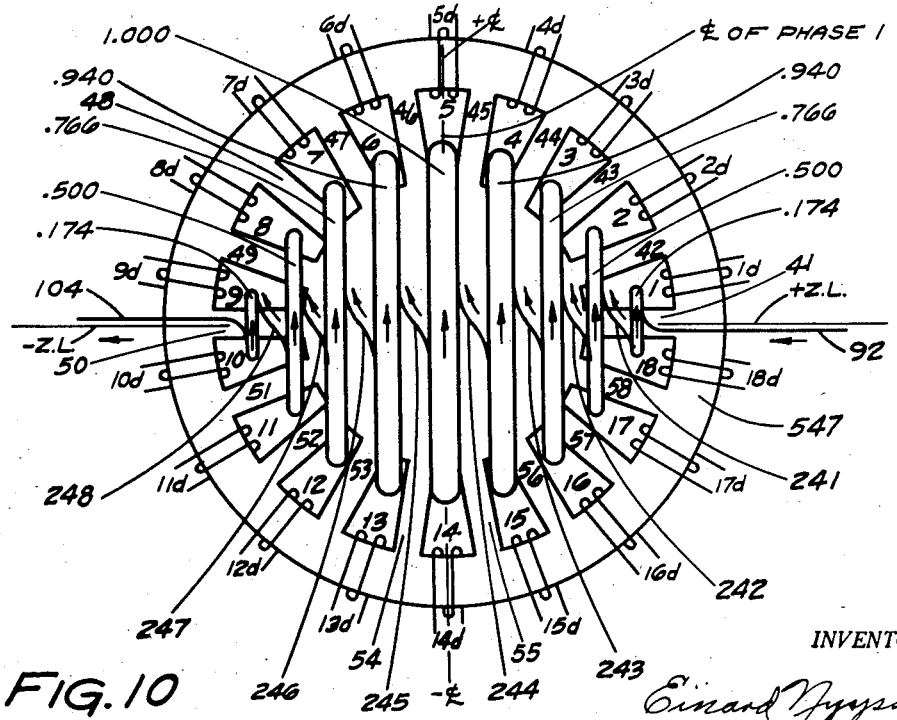
Figure 14:
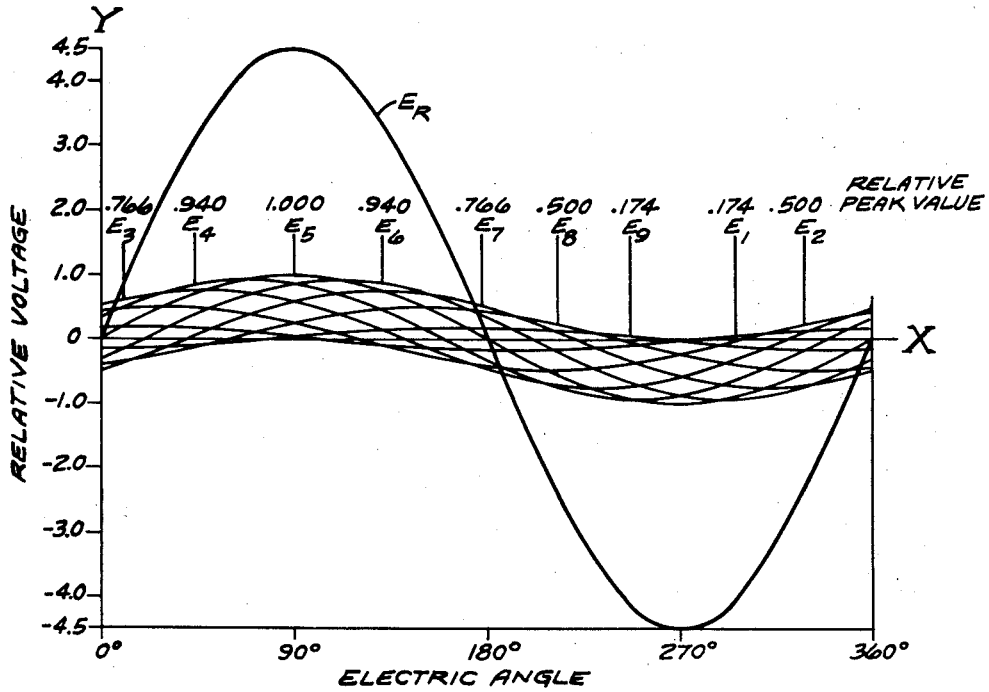
Figure 15:
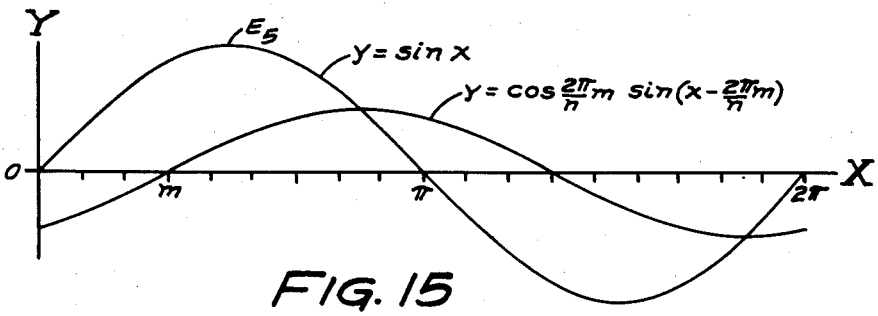
Figure 16:
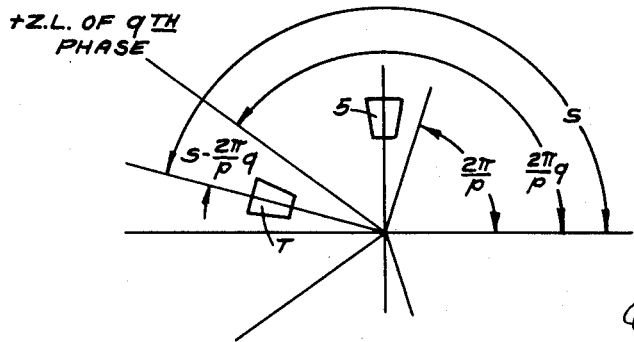

The invention will now be more fully explained in connection with the accompanying drawings, in which Fig. 1 is a schematic view illustrating diagrammatically, in simple form, for explanatory purposes, a transformer system embodying the invention, for transforming between a polyphase electric system of nine phases and a three-phase substantially sinusoidal electric system, the transformer system being shown linearly arranged and comprising a two-collection assembly of three transformers, one corresponding to each phase of the three-phase electric system, the three transformers being respectively provided with three magnetizable transformer cores the left-hand portions of which are diagrammatically shown nine times, eight times by dot-and-dash or phantom lines and once by full lines, in order to indicate diagrammatically that all nine of the distributed single-phase windings of the nine-phase winding are wound about the same respective left-hand fragmentary portions of the same three transformer cores, though diagrammatically shown separated, for clearness; Fig. 2 is a similar schematic view of a modified transformer system comprising a single-collection assembly of nine transformers for effecting the same transformation; Fig. 3 is a similar schematic view of a transformer system similar to that of Fig. 2, but comprising a two-collection assembly, shown arranged geometrically along the circumference of a circle, in order the more easily to associate phase angles with geometric angles, as an aid to an understanding of the theory underlying the present invention; Fig. 4 is a similar schematic view of a transformer system similar to Fig. 1, but comprising a single-collection assembly of only two transformers and a two-phase unsymmetrical winding and a nine-phase unsymmetrical winding; Fig. 5 is a schematic diagrammatic view, similar to the schematic views shown in Figs. 1 to 4, inclusive, illustrating diagrammatically a transformer system comprising a single-collection assembly of two transformer cores or magnetic circuits, as shown also in Fig. 4, but provided with primary and secondary polyphase windings similar to the nine-phase unsymmetrical winding shown in Fig. 4; Fig. 6 is a block diagram illustrating a transformer system similar to the transformer systems of Figs. 2 and 3, but provided with three collections of transformers; Fig. 7 is a schematic diagrammatic view of a single-collection-assembly transformer system similar to the transformer system shown in Fig. 2, but with a polyphase unsymmetrical winding having only two distributed phase windings, instead of a three-phase symmetrical polyphase winding; Fig. 8 is a diagram, in Cartesian coordinates, illustrating the alternating voltages, assumed to be sinusoidal, induced in unit conductor groups, each assumed to have a unit number of conductors, one disposed in each of the transformer-core slots illustrated in Figs. 2, 3 and 7; Fig. 9 is a schematic diagrammatic view, similar to Fig. 3, but with a single unitary core structure provided with the conductor groups of only one distributed phase winding, which may be considered as the phase 1 distributed winding, of a polyphase winding similar to the polyphase winding illustrated in Fig. 3, and illustrating also, by dot-and-dash lines, the paths of the magnetic linkages; Fig. 10 is a schematic diagrammatic view similar to Fig. 9, but showing a different method of winding the sinusoidally distributed phase windings of either a two-phase or a three-phase winding; Fig. 11 is a schematic view similar to Fig. 3, but comprising a two-collection assembly of nine transformers; Figs. 12 and 13 are diagrams illustrating Y and delta connections, respectively, for the three-phase winding of Fig. 2; Fig. 14 is a diagram, in Cartesian coordinates, explanatory of the component voltages induced in the conductor groups of the distributed phase winding corresponding to phase 1 shown in Figs. 2, 3 and 7, when all the component voltages are assumed sinusoidal; Fig. 15 is a diagram illustrating, by means of curves, two of the sinusoidal voltage components of Fig. 14, for explanatory purposes; and Fig. 16 is a diagram for facilitating the calculation of the magnetomotive forces.

The polyphase transformer system of the present invention may be constituted of a plurality of transformers. Nine such transformers, constituting one assembly, are shown, for example, by full lines, in the lower portion of each of Figs. 2 and 7, equally spaced along a straight line. In the central portion of Fig. 3, as another example, there are shown, by full lines, eighteen such transformers, also constituting an assembly, equiangularly spaced along the circumference of a circle. In other figures, there are shown still other geometric configurations. The linear geometric arrangement illustrated in Figs. 2 and 7, the circular geometric arrangement illustrated in Fig. 3 and the other geometric configurations, however, are entirely without significance. In the practical applications of the invention, the transformers may be arranged according to any desired geometric pattern. The circular arrangement shown in Fig. 3 lends itself simply to associating phase angles with geometric angles, and to dealing with trigonometric functions. The linear arrangement shown in Figs. 2 and 7, on the other hand, represents a more practical form in which to embody the invention.

The magnetizable cores of the transformers of Figs. 2 and 7 are shown at 901 to 909, and those of Fig. 3 at 901 to 918. In these Figs. 2, 3 and 7, the magnetizable cores 901 to 918 are shown separate and individual.

It is not essential, however, that the transformer cores be separate and individual. The separate transformer cores 901 and 918 of Fig. 3, for example, are shown replaced in Figs. 9 and 10 by a single circular magnetizable core 547.

The eighteen transformer cores 901 to 918 of Fig. 3 will be referred to as an assembly of two similar collections, each of nine transformer cores 901 to 909 and 910 to 918, respectively.

The eighteen transformer-core slots 1 to 18, in which the transformer primary and secondary windings are respectively disposed, will similarly be referred to as an assembly of two similar collections, each of nine transformer-core slots 1 to 9 and 10 to 18, respectively.

The magnetic system of eighteen magnetic circuits respectively encircling the transformer-core slots 1 to 18, and constituted of the transformer cores 901 to 918, will likewise be referred to as an assembly of two similar collections, each of nine magnetic circuits.

The collection of linearly arranged transformer cores 901 to 909, and the collection of magnetic circuits respectively encircling the collection of transformer-core slots 1 to 9 of Figs. 2 and 7, may also be referred to as assemblies of transformer cores, transformer magnetic circuits and transformer-core slots, respectively, each assembly comprising only a single collection.

As will appear hereinafter, the transformer system of the present invention is not restricted to use with an assembly of only one or two collections of transformer cores and transformer-core slots. The assembly may comprise only three, four or any other convenient number of collections of transformer cores and transformer-core slots.

The eighteen transformer cores 901 to 918 of Figs. 2, 3 and 7 are shown provided with a polyphase winding comprising eighteen phase windings 1d to 18d respectively wound through the transformer-core slots 1 to 18. These eighteen phase windings 1d to 18d are illustrated as like phase windings, identical in all respects, each having two terminals, and all provided with the same number of conductors or turns. They may be referred to as individual concentrated phase windings, to distinguish them from the hereinafter more fully described distributed phase windings.

As will be explained later, the operation of the transformer system of the present invention is reversible. The windings 1d to 18d may therefore function either as primary or secondary phase windings. For the present, however, the windings 1d to 18d will be regarded as the primary windings.

The nine phase windings 1d to 9d of Figs. 2 and 7 and the eighteen phase windings 1d to 18d of Fig. 3 may be excited from respective polyphase input-supply systems, not shown, of nine and eighteen alternating or cyclically varying phases of equal amplitude that are substantially equally phase-displaced over a total range of phase displacement of $\pi$ or 180 degrees and $2\pi$ or 360 degrees, respectively. The phase displacement of adjacently disposed windings 1d to 18d, therefore, is 20 electric degrees, and the displacement of diametrically oppositely disposed windings of Fig. 3 is $\pi$ or 180 degrees. The $\pi$ or 180 degree phase displacement arises from the progressive phase displacment of the windings 1d to 18d, and not from a change in the polarity or the direction of the windings.

Owing to the fact that the windings 1d to 18d are all alike, the primary currents produce substantially like magnetomotive forces in the transformer-core slots within the respective magnetic circuits. These substantially like magnetomotive forces respectively energize the transformer cores or magnetic circuits with alternating magnetic flux of the same wave form and the same peak amplitude.

The transformer system of the present invention is provided with a further polyphase winding which may be provided with two, three, or any other desired number of distributed phase windings. These distributed phase windings are illustrated as comprising conductors or turns would in the transformer-core slots around the sides or legs of the transformer cores. Only those portions of the conductors or turns that are disposed inside the transformer-core slots, of course, are effective for voltage-inducing purposes. The function of the remaining parts of the conductors or turns, on the outside of the respective transformer-core slots, is merely to complete the electric connections between the portions of the conductors or turns inside the transformer-core slots. It will conduce to clarity, during the theoretical discussion, to refer merely to the number of conductors of each distributed phase winding disposed in each transformer-core slot. For definiteness, the conductors of any distributed phase winding disposed in one particular transformer-core slot may be referred to as a conductor group.

For the present, it will be assumed that this polyphase winding is the secondary polyphase winding and, accordingly, the distributed phase windings and the conductor groups thereof will be referred to as distributed secondary phase windings and secondary-winding conductor groups, respectively.

In Figs. 2, 3 and 7, only the conductor groups of the first or phase 1 distributed secondary phase winding are shown wound directly on the full-line transformer cores 901 to 918. The conductor groups of the additional distributed secondary phase windings are shown diagrammatically, for clearness, wound in the transformer-core slots of dot-and-dash or phantom-core fragments, separate from the full-line transformer cores. In Figs. 2 and 3, the transformer cores are therefore shown three times, to correspond to three phases. In Fig. 7, they are similarly shown twice, to correspond to two phases. This showing, however, is for purposes of clarity only, in order not to introduce confusion into the drawings. In actual practice, of course, the respective conductor groups, associated with all the distributed secondary phase windings, are wound in the same transformer-core slots 1 to 18 of the same transformer cores 901 to 918.

Each distributed phase winding of the present invention comprises conductor groups, one disposed in each transformer-core slot, and the number of conductors of the conductor groups varies from slot to slot of the assembly of transformer-core slots. The fact that the number of conductors or turns comprising the conductor groups disposed in the transformer-core slots varies from transformer-core slot to transformer-core slot is diagrammatically indicated in the drawings in various ways. It is indicated by numbers, not greater than unity or 1.000; also by showing the conductor groups or windings as of different thickness; and further by showing the conductor groups or windings disposed in some of the transformer-core slots, either in section or otherwise, as containing more conductors or turns than other conductor groups or windings disposed in other transformer-core slots.

In Figs. 2, 3, 7, 10 and other figures, the conductor groups are shown provided by coils or windings disposed in the various transformer-core slots 1 to 18. The coils or windings, like the conductor groups previously described, are indicated by decimal fractions which also indicate the relative numbers of turns of these coils or windings. As each conductor group may be constituted of more than one coil or winding, the relative number of conductors of a conductor group is necessarily the sum of the relative numbers of turns of the coils or windings of which that conductor group is constituted.

The numbers of conductors of the conductor groups of the phase 1 distributed phase winding are shown varying substantially as the absolute or positive values of the sine function over an angular range equal to $\pi$ or 180 degrees times the number of collections of transformer-core slots. The numbers of conductors of the conductor groups of the other distributed phase windings are shown varying in a similar manner, but the respective angular ranges of the said sine function are displaced by angular amounts substantially equal to the phase displacement of the respective phase windings. Improved performance may, however, be obtained even though the conductors of the conductor groups are not distributed strictly according to the sine function. The distribution may, for example, be in accordance with substantially the absolute or positive values of other alternating functions the values of which, like the values of the sine function, progressively: first, increase from zero to a maximum in the interval zero to $\pi/2$ or 90 degrees; then decrease, through zero to a minimum in the interval $\pi/2$ or 90 degrees to $3\pi/2$ or 270 degrees; and, finally, increase again to zero in the interval $3\pi/2$ or 270 degrees to $2\pi$ or 360 degrees.

In the two-collection assembly of Fig. 3, the points on the circumference where the numbers of conductors of the conductor groups of the phase 1 distributed phase winding are theoretically proportional to the values of the sine of 0, $\pi/2$ or 90, $\pi$ or 180, and $3\pi/2$ or 270 degrees are indicated by the radial reference lines +Z. L., + ₵, −Z. L. and − ₵, respectively.

In the single-collection assembly of Figs. 2 and 7, the numbers of conductors of the conductor groups of the phase 1 distributed phase winding are shown varying from right to left substantially as the absolute or positive values of the sine function over the angular range 0 to $\pi$ or 180 degrees, rather than 0 to $2\pi$ or 360 degrees.

With this selection of reference lines, the numbers of conductors of the phase 1 distributed phase winding disposed in the positive collection of transformer-core slots 1 to 9 of Figs. 2, 3 and 7 and the negative collection of transformer-core slots 10 to 18 of Fig. 3 are respectively proportional to 0.174, 0.500, 0.766, 0.940, 1.000, 0.940, 0.766, 0.500 and 0.174, the absolute or positive values of the sine of the progressively increasing angles 10, 30, 50, 70, 90, 110, 130, 150 and 170 degrees, corresponding to the positive collection, and 190, 210, 230, 250, 270, 290, 310, 330 and 350 degrees, corresponding to the negative collection. In the two-collection assembly of Fig. 3, these angles are equal to the angles subtended by the respective transformer-core slots 1 to 18 at the center of the circle, measured counterclockwise from the positive reference zero line +Z. L. They may therefore be referred to as slot angles. The slot angle of the transformer-core slot 2 of Fig. 3, for example, is marked "S."

More generally, the conductors of the phase 1 distributed phase winding are proportional to the sine of phase-sequence angles measured with respect to a reference phase which corresponds to the positive reference zero line +Z. L. In Figs. 2, 3 and 7, this reference phase is the phase midway between the phases of the alternating magnetic fluxes of the magnetic circuits encircling the transformer-core slots 18 and 1. It may be termed a positive reference phase, and it may be associated with a phase-sequence angle of zero degrees. The alternating magnetic fluxes of the magnetic circuits encircling the transformer-core slots 1 to 18 being respectively 10, 30, 50, 70, 90, 110, 130, 150, 170, 190, 210, 230, 250, 270, 290, 310, 330 and 350 magnetic degrees behind the positive reference phase, the transformer cores 901 to 918 and the transformer-core slots 1 to 18 thereof may be associated with phase-sequence angles which are respectively the same as the previously described geometric-sequence or slot angles.

From considerations of theory, the range of the phase-sequence angles of any practical collection of transformer-core slots, represented, in Figs. 2, 3 and 7, by the 160 degrees of the collection of nine transformer-core slots 1 to 9 or 10 to 18, will be regarded as embracing substantially the theoretical range zero to $\pi$ or 180 degrees; and the range of the phase-sequence angles of any practical two-collection assembly of transformer-core slots, represented by the 340 degrees of the two-collection assembly of eighteen transformer-core slots 1 to 18, will similarly be regarded as embracing substantially the theoretical range zero to $2\pi$ or 360 degrees.

To provide substantially equal phase displacement of the three distributed phase windings of Fig. 3, the total angular ranges corresponding to the phase 2 and phase 3 distributed phase windings are respectively displaced with respect to the total angular range corresponding to the phase 1 distributed phase winding substantially $2\pi/3$ or 120 degrees and $4\pi/3$ or 240 degrees in the direction of the phase sequence. In this case, and in all similar cases, the angular displacement with respect to one another of the total angular ranges corresponding to the respective phase windings is an angular amount substantially equal to the phase displacement of the respective phase windings of the polyphase winding.

The conductor groups of the phase 2 and phase 3 distributed secondary phase windings of Fig. 3, similarly distributed over their respective total angular ranges, are duplicates of the conductor groups of the phase 1 distributed phase winding, but respectively displaced counterclockwise $2\pi/3$ or 120 and $4\pi/3$ or 240 degrees, respectively. They are duplicates, however, only because the particular number 18 of magnetic circuits or transformer-core slots is divisible by three, the particular number of distributed phase windings.

In the two-phase single-collection assembly of Fig. 7, wherein the displacement of the total angular ranges is only $\pi/2$ or 90 degrees, because, in this case, the number 18 of transformer-core slots or magnetic circuits is not divisible by four, the conductor groups of the phase 2 distributed secondary phase winding are different, although arrived at in exactly the same manner. In Fig. 7, the decimal fractions 0.985, 0.866, 0.643, 0.342, 0.000, 0.342, 0.643, 0.866 and 0.985, respectively indicating the numbers of conductors of the conductor groups of the phase 2 distributed secondary phase winding disposed in the transformer-core slots 1 to 9, are respectively the absolute or positive numerical values of the sine of 280, 300, 320, 340, 360, 20, 40, 60 and 80 degrees, the geometric-sequence or phase-sequence angles associated with the respective transformer-core slots decreased by $\pi/2$ or 90 degrees, the displacement of the respective total angular ranges.

A conductor group of each phase winding is thus disposed in each transformer-core slot. In Fig. 7, the transformer-core slots 5 and 14, representing a limiting case, are shown unprovided with conductor groups corresponding to the phase 2 distributed secondary phase winding. This, however, is only an apparent, and not a real, exception to the rule. It would occur in all such cases where the angle corresponding to that conductor group is equal to zero or a multiple of $\pi$ or 180 degrees. As required by the sine law, such a conductor group would have zero conductors, and would be indicated as 0.000. With this explanation, and including this limiting case, it may be said that each distributed secondary phase winding has a number of conductor groups substantially equal to the number of transformer-core slots, that a conductor group of each distributed secondary phase winding is disposed substantially in each transformer-core slot and the magnetic circuit encircling such transformer-core slot, and that the number of conductors of the conductor groups of each distributed secondary phase winding varies substantially as the absolute or positive numerical values of the sine over a total range substantially equal to $\pi$ or 180 degrees multiplied by the number of collections of magnetic circuits or transformer-core slots at angular increments each substantially equal to the total range divided by the number of magnetic circuits or transformer-core slots provided by the transformer cores.

In the arrangements of Figs. 2 and 7, the number of collections is one, and in the arrangements of Figs. 3, 9 and 10, the number of collections is two. To represent the general case, there is illustrated in Fig. 6, by means of a block diagram, a three-collection assembly provided with 27 concentrated primary windings 1d to 27d and three distributed secondary phase windings corresponding to phase 1, phase 2 and phase 3. The angular increment in each of these figures is equal to the total angular range, π or 180 degrees multiplied by the number of collections, in this case three, divided by the number of magnetic circuits or transformer-core slots in each assembly, namely 27, or 20 degrees. The angular increment will, of course, vary depending upon the number of transformer-core slots or magnetic circuits in each collection. The sequence of these angular increments is the same as the phase sequence.

The direction of winding of the conductors of the conductor groups of each distributed phase winding changes with the sign of the alternating function that determines the numbers of conductors of the respective conductor groups. It is illustrated in Figs. 1 to 5, 7 and 9 to 11 as changing with the sign of the sine function.

The conductor groups of each distributed phase winding are connected in series along the above-described directions of winding into the respective phase-winding circuits. Although the conductor groups of each distributed phase winding may be connected in series in any desired sequence, for uniformity and simplicity, they are shown herein connected into the respective phase-winding circuits in the order of their geometric or phase sequence. The directions of winding will be readily understood following a discussion of the respective phase-winding circuits. The series circuit of the phase 1 distributed secondary phase winding is shown in Figs. 2, 3 and 7 extending from a line conductor 350, through the various coils or windings disposed in the transformer-core slots 1 to 9 and the various intermediately disposed conductors 351 to 358, inclusive, to the further conductor 359. The connections of the coils or windings are such that the direction of winding of the conductor groups is all in the same positive direction, downward, away from the reader.

In the arrangement of Fig. 3, the conductor 359 is shown connecting together the 0.174 coils or windings disposed in the transformer-core slots 9 and 10, but with a reversal in the direction of connection. The series phase 1 distributed-phase-winding circuit continues through the various coils or windings disposed in the transformer-core slots 10 to 13 and the various intermediately disposed conductors 360 to 367, inclusive, to a line conductor 368. These connections of the coils or windings are such that the direction of winding of the conductor groups disposed in the negative collection of transformer-core slots 10 to 18 is all in the same negative direction, upward, or toward the reader, and opposite to the direction of winding of the conductor groups disposed in the positive collection of transformer-core slots 1 to 9.

The connecting conductors by means of which the coils or windings of the phase 2 and phase 3 distributed secondary windings of Fig. 3 are series-connected into their respective phase-winding circuits are shown numbered with the same reference numerals as for phase 1, but augmented by 100 for phase 2 and by 200 for phase 3.

In the single-collection assembly of Fig. 2, the phase 2 distributed secondary phase winding is illustrated as constituted of that half of the phase-winding circuit that is connected between the conductors 462 and 453 which, in Fig. 2, may therefore be referred to as line conductors.

The series circuits of the conductor groups of the various distributed windings comprise complete phase windings which may be connected either in delta or Y. The delta and Y connections for the assembly shown in Fig. 2 are respectively illustrated diagrammatically in Figs. 12 and 13.

In the single-collection assembly of Fig. 7, the conductor groups of the phase 2 distributed secondary phase winding disposed in the transformer-core slots 1 to 4 are associated with negative values of the sine, and those disposed in the transformer-core slots 6 to 9, with positive values of the sine. The series phase-winding circuit for this phase 2 distributed secondary phase winding may be traced, first with a negative direction of winding, from the line conductor 370, through the conductor groups respectively disposed in the transformer-core slots 1 to 4 and the intermediately disposed conductors 371 to 373, to the conductor 374. Then, with a change to the positive direction of winding, the series phase-winding circuit continues, from the conductor 374, through the conductor groups disposed in the transformer-core slots 6 to 9 and the intermediately disposed conductors 375 to 377, to a conductor 378 connected to a common line conductor 379.

For analytical purposes, it will be first assumed that, in each transformer-core slot, there is disposed a conductor group of the same number of turns or conductors, and that these conductor groups, like the individual concentrated primary windings $1d$ to $18d$ of Figs. 2, 3 and 7, are wound in the same direction through the transformer-core slots 1 to 18. This number of turns or conductors will hereinafter be referred to as the unit number of turns or conductors, and the conductor group embodying such unit number of turns or conductors will be referred to as the unit conductor group.

The equal alternating voltages induced in the unit conductor groups disposed in the various transformer-core slots may be termed unit voltages, and their peak amplitudes may also be taken as unity. Assuming a sinusoidal wave form, the unit voltages induced in unit conductor groups respectively disposed in the transformer-core slots 1 to 9 of Figs. 2 and 7 may be represented by the curves $e_1$ to $e_9$ of Fig. 8. To avoid the confusion that would be introduced by nine additional curves, the voltages induced in unit conductor groups respectively disposed in the transformer-core slots 10 to 18 of Fig. 3 may be represented by means of the respective vectors $e_{10}$ to $e_{18}$ of Fig. 8. Each of these vectors, positioned on the axis of abscissae at the point at which occurs the corresponding peak unity or 1.000 value, represents a sinusoidal variation of exactly the same type as do the curves $e_1$ to $e_9$.

In each distributed-phase-winding conductor group, a voltage will be induced proportional to the number of conductors or turns in the conductor group. Each such induced voltage, for reasons which will become apparent, will be referred to as a component voltage.

Referring to Fig. 14, the component voltages induced in the conductor groups of the phase 1 distributed phase winding disposed in the transformer-core slots 1 to 9 are represented by the curves $E_1$ to $E_9$, respectively.

The component voltages induced in the negative collection of transformer-core slots 10 to 18 are duplicates of those induced in the positive collection of transformer-core slots 1 to 9, and will be represented by sinusoidal curves that are duplicates of, and superposed upon, the respective sine curves $E_1$ to $E_9$.

The component voltages induced in the conductor groups disposed in the transformer-core slots of the single collection of transformer-core slots 1 to 9, represented by the curves $E_1$ to $E_9$, respectively, will add, in the series distributed-secondary-phase-winding circuit described, to produce the resultant voltage represented by the curve $E_R$ of Fig. 14. This voltage addition may be expressed by the equation $$E_R = E_1 + E_2 + E_3 + E_4 + E_5 + E_6 + E_7 + E_8 + E_9 \quad (1)$$

By substitution, this resultant voltage may be expressed, in terms of the original unit voltages, as $$E_R = e_1 \sin 10° + e_2 \sin 30° + e_3 \sin 50° \ldots$$
$$+ e_9 \sin 170° \quad (2)$$

By analysis similar to that applied to Fig. 19 of the applicant's copending application for Polyphase Synchronous Machine, Serial No. 395,972, filed December 3, 1953, it may be shown that, if the component voltage corresponding to $E_5$ induced in the conductor group disposed in the central transformer-core slot is represented, as in Fig. 15, by $$y = \sin x$$

and the component voltage induced in the conductor group disposed in the $m$th transformer-core slot of a two-collection assembly of $n$ transformer-core slots is represented by $$y = \cos \frac{2\pi}{n} m \sin \left( x - \frac{2\pi}{n} m \right)$$

then the composite voltage $E_R$ induced in the complete phase 1 distributed phase winding of a two-collection assembly is represented by the equation $$E_R = \frac{n}{2} \sin x \qquad (3)$$

In certain practical applications of the present invention, the voltages impressed upon the primary phase windings $1d$ to $18d$ of Figs. 2, 3 and 7 are of the same wave form and the same peak amplitude, but they are not sinusoidal. However, by analysis also similar to that of the said application Serial No. 395,972, it may be shown that the resultant composite voltage $E_R$ nevertheless is very nearly sinusoidal.

According to this analysis, it is possible to represent any harmonic voltage of any amplitude H, of any harmonic order $h$, in any desired phase relation $\beta$, induced in the conductor group of the phase 1 distributed phase winding disposed in the $m$th transformer-core slot by the equation $$y = H \cos \left( \theta + \frac{2\pi}{n} m \right) \sin h \cdot \left( x - \theta - \beta - \frac{2\pi}{n} m \right)$$

This equation introduces an angle $\theta$ to represent the general case in which the transformer-core slots are displaced by that angle from the position shown in the drawings. In that position, of course, $\theta = 0$.

The sum of the harmonic voltages of the harmonic order $h$ induced in the conductor groups of the phase 1 distributed secondary phase winding comprising two collections of conductor groups accordingly becomes represented by the equation $$Y = H \Sigma \cos \left( \theta + \frac{2\pi}{n} m \right) \sin h \cdot \left( x - \theta - \beta - \frac{2\pi}{n} m \right)$$

It may be shown that this equation equals zero, except when $h \pm 1$ is any whole number $k$ multiplied by $n$, the number of transformer-core slots in the two-collection assembly of transformer-core slots, or $$h = kn \pm 1$$

In either of these two latter cases, the equation reduces to $$Y = \frac{n}{2} H \sin [h \cdot (x - \theta - \beta) \pm \theta] \qquad (4)$$

All other harmonics of the non-sinusoidal component voltages cancel in the sinusoidally distributed secondary phase winding.

The transformer system shown in Fig. 2, as previously explained, performs in exactly the same manner as each of the two like collections of the two-collection assembly of Fig. 3, and the same harmonics are therefore cancelled. Similar considerations apply to the cancellation of the harmonics in the sinusoidally distributed phase 2 and phase 3 windings of Figs. 2 and 3, and the phase 1 and phase 2 sinusoidally distributed phase windings of Fig. 7.

It is well-known that the third harmonic and the odd multiples of the third harmonic can be readily cancelled in a three-phase electric system. An important feature of the present invention, however, resides in providing a transformer system in which further selected harmonics may be cancelled. To accomplish this, the transformer system of Figs. 2, 3 and 7 is provided with four or more transformer-core slots in each collection of transformer-core slots, and respective individual or concentrated windings are disposed therein. More generally, since corresponding individual or concentrated windings of the various collections may be excited from the same primary phase, the transformer system of Figs. 2, 3 and 7 may be said to be provided with four or more individual or concentrated phase windings.

It is now in order to consider the operation of the transformer system of the present invention under load conditions. By analysis also similar to that given in connection with the applicant's copending application Serial No. 395,972, it may be shown that sinusoidal currents of the distributed phase windings provide equally phase-displaced magnetomotive forces of equal amplitude to the transformer-core slots.

Briefly, a unit magnetomotive force of the phase 1 current produced in a unit number of conductors disposed in any transformer-core slot is represented by the equation $$y = \sin x$$

and the unit magnetomotive force of the $q$th phase current similarly produced in a unit number of conductors disposed in any transformer-core slot is represented by the equation $$y = \sin \left( x - \frac{2\pi}{p} q \right)$$

As shown in Fig. 16, the number of conductors of the conductor group of the $q$th distributed secondary phase winding disposed in any transformer-core slot T is $$\sin \left( S - \frac{2\pi}{p} q \right)$$

The component magnetomotive force of the current of the $q$th phase in the transformer-core slot T is therefore represented by $$y = \sin \left( S - \frac{2\pi}{p} q \right) \sin \left( x - \frac{2\pi}{p} q \right)$$

and the total magnetomotive force contributed in the transformer-core slot T by the currents of all $p$ phases is $$y = \Sigma \sin \left( S - \frac{2\pi}{p} q \right) \sin \left( x - \frac{2\pi}{p} q \right)$$

where the summation is again to be taken over the whole $2\pi$ or 360 degrees corresponding to the total range of phase displacement of the $p$ phases. This equation reduces to $$y = \frac{p}{2} \cos (S - x) \qquad (5)$$

In the polyphase transformer system of the present invention, accordingly, a substantially sinusoidal component magnetomotive force is supplied to each transformer-core slot by the substantially sinusoidal alternating current of each sinusoidally distributed phase winding. The amplitude and the polarity of each of these component magnetomotive forces are determined respectively by the number of conductors of the conductor group in which it is produced and the direction of winding of these conductors. Due to the displacement of the total angular ranges by means of which the relative numbers of conductors of the conductor groups of the respective phase windings are determined, the combined or total magnetomotive forces contributed to the various transformer-core slots are equally phase-displaced over the same total range of phase displacement as the primary currents and the alternating magnetomotive forces produced thereby. Unlike the primary magnetomotive forces, however, the secondary total magnetomotive forces are substantially sinusoidal.

The magnetomotive-force contributions of the primary and secondary polyphase currents have the same phase displacement in each magnetic circuit, and the contributions from each of these two sources have the same peak amplitude and wave form in each of the magnetic circuits. The resultant magnetic fluxes of the magnetic circuits encircling the transformer-core slots 1 to 18 are therefore of the same peak amplitude and wave form and they are equally phase-displaced over the characteristic total range of phase displacement of 180 magnetic degrees corresponding to each collection. This, as previously described, was the condition necessary to produce substantially sinusoidal equally phase-displaced composite induced voltages.

The absolute phase relation of the magnetomotive forces of the polyphase current is determined by the power factor of the load. However, the resultant magnetic fluxes remain of like wave form, and the induced composite voltages remain substantially sinusoidal, irrespective of changes resulting from changes in the load and changes introduced by variations in the power factor of the load. Reference may now be had to Fig. 11, which is a counterpart, in all respects, of Fig. 3, except that the two-collection assembly of eighteen transformers has been replaced by a two-collection assembly of only nine transformers.

In Fig. 11, the positive reference zero line $+Z \cdot L \cdot$ and the corresponding positive reference zero phase have been selected so that the geometric-sequence or phase-sequence angles associated with the transformer-core slots 1, 3, 5, 7, 9, 11, 13, 15 and 17 are 10, 50, 90, 130, 170, 210, 250, 290 and 330 degrees, and the relative numbers of conductors of the phase 1 distributed phase winding disposed in these transformer-core slots are 0.174, 0.766, 1.000, 0.766, 0.174, 0.500, 0.940, 0.940 and 0.500, exactly the same as they are in Fig. 3.

The series phase-winding circuit for phase 1 may be traced, in Fig. 11, from a line conductor 750, through the 0.174 conductor group disposed in the transformer-core slot 1, by way of a conductor 751, through the 0.766 conductor group disposed in the transformer-core slot 3, and so on through the remaining 1.000, 0.766, 0.174, 0.500, 0.940, 0.940 and 0.500 conductor groups by way of the respective conductors 752 to 758, to the line conductor 759. In Fig. 11, as in Fig. 3, the connections provide a positive direction of winding in the transformer-core slots 1, 3, 5, 7 and 9, and a negative direction of winding in the transformer-core slots 11, 13, 15 and 17.

The phase 2 and phase 3 sinusoidally distributed phase windings, shown wound on phantom core fragments, are respectively displaced $2\pi/3$ or 120 and $4\pi/3$ or 240 degrees counterclockwise. For reasons previously explained in connection with Fig. 3, these phase 2 and phase 3 sinusoidally distributed phase windings are duplicates of the phase 1 sinusoidally distributed phase winding. The conductors connecting the conductor groups are shown numbered with the same reference numerals as for phase 1, but augmented by 10 for phase 2 and by 20 for phase 3.

The transformers embodying the transformer-core slots 11, 13, 15 and 17 of Fig. 3, according to the previous explanation, function in the same manner as do the transformers embodying the transformer-core slots 2, 4, 6 and 8. By simple substitution, therefore, it is apparent that the transformer system of Fig. 11 functions in the same manner as the positive collection of Fig. 3, the negative collection of Fig. 3, the complete two-collection assembly transformer system of Fig. 3 and the single-collection transformer system of Fig. 2.

From this it may be concluded that the effectiveness of the harmonic cancellation is dependent upon the number of different transformers in the particular transformer system, whether they are embodied in one, two or any other number of collections of transformers.

To effect cancellation of the 5th harmonic, the transformer system of Fig. 11, like the transformer system of Figs. 2, 3 and 7, should be provided with four or more individual or concentrated phase windings.

It is also possible, within the invention, to have transformer systems in which the sinusoidally distributed phase windings of the one polyphase winding respectively correspond to the phases of the non-sinusoidal, rather than the sinusoidal, polyphase electric system, and in which the individual or concentrated phase windings of the other polyphase winding respectively correspond to the phases of the sinusoidal, rather than the non-sinusoidal, polyphase electric system.

There is shown in Fig. 1 a transformer system of this further type that performs the same transformation, between the nine-phase non-sinusoidal electric system and the three-phase substantially sinusoidal electric system, that is performed by the transformer system of Fig. 2. As a further example, there is shown in Fig. 4 a transformer system that performs the same transformation, between the nine-phase non-sinusoidal electric system and the two-phase substantially sinusoidal electric system, that is performed by the transformer system of Fig. 7.

The transformer system of Fig. 1 is shown provided with three linearly-arranged transformer cores 1401, 1402 and 1403 and three like individual concentrated phase 1, phase 2 and phase 3 windings respectively wound through the transformer-core slots 1301, 1302 and 1303 of the respective transformer cores 1401, 1402 and 1403. The transformer system of Fig. 4 is similarly shown provided with two transformer cores 1404 and 1405 and two like individual concentrated phase 1 and phase 2 windings respectively wound through the transformer-core slots 1304 and 1305 of the respective transformer cores 1404 and 1405.

The transformer system of Fig. 1 is shown provided with nine distributed phase windings 1g to 9g respectively corresponding to the nine phases of a nine-phase unsymmetrical electric system. Each of these distributed phase windings comprises three conductor groups, one disposed in each of the transformer-core slots 1301, 1302 and 1303, connected in series into respective phase-winding circuits. The transformer system of Fig. 4 is similarly shown provided with nine distributed phase windings 1h to 9h, also respectively corresponding to the nine phases of the nine-phase unsymmetrical electric system. Each of these distributed phase windings, however, comprises only two conductor groups, one disposed in each of the transformer-core slots 1304 and 1305, connected in series into respective phase-winding circuits.

The total range of phase displacement of the individual concentrated phase 1, phase 2 and phase 3 windings of Fig. 1 and, therefore, of the transformer cores or magnetic circuits 1401, 1402 and 1403 also, is equal to $2\pi$ or 360 electric and magnetic degrees, respectively. The transformer system of Fig. 1 therefore comprises two collections of transformers, transformer cores and transformer-core slots. The transformer system of Fig. 4, on the other hand, comprises only a single collection of transformers, transformer cores and transformer-core slots, for the total range of phase displacement of the phase 1 and phase 2 windings and of the respective transformer cores 1404 and 1405 is only $\pi$ or 180 degrees.

In Fig. 1, the conductor groups of the distributed phase winding 1g, disposed in the transformer-core slots 1301, 1302 and 1303, are shown respectively provided with 0.766, 0.174 and 0.940 relative numbers of conductors, respectively equal to the sine of the geometric-sequence or phase-sequence angles 50, 170 and 290 degrees associated with the transformer-core slots in which they are respectively disposed. Similarly, in Fig. 4, the conductor groups of the distributed phase winding 1h, disposed in the transformer-core slots 1304 and 1305, are shown provided with relative numbers of conductors respectively equal to 0.985 and 0.174, the sine of the respective geometric-sequence or phase-sequence angles 80 and 170 degrees.

The relative numbers of conductors of the conductor groups of the other sinusoidally distributed phase windings 2g to 9g of Fig. 1 and 2h to 9h of Fig. 4 are determined in the same manner, but with the angular values associated with the respective conductor groups decreased by the amount of the phase displacement of the respective sinusoidally distributed phase windings with respect to the sinusoidally distributed phase windings 1g and 1h of Figs. 1 and 4, respectively.

In Fig. 1, the series phase-winding circuit of the sinusoidally distributed phase winding 1g is shown extending from a line conductor 1311, through the 0.766 conductor group disposed in the transformer-core slot 1301, by way of a conductor 1312, through the 0.174 conductor group disposed in the transformer-core slot 1302, and, by way of a conductor 1313, through the 0.940 conductor group disposed in the transformer-core slot 1303, to a line conductor 1314. Similarly, the series phase-winding circuits of the sinusoidally distributed windings 2g to 9g respectively extend from the line conductors 1321, 1331, 1341, 1351, 1361, 1371, 1381 and 1391, through the respective 0.500, 0.174, 0.174, 0.500, 0.766, 0.940, 1.000 and 0.940 conductor groups disposed in the transformer-core slot 1301, by way of the respective conductors 1322, 1332, 1342, 1352, 1362, 1372, 1382 and 1392, through the respective 0.500, 0.766, 0.940, 1.000, 0.940, 0.766, 0.500 and 0.174 conductor groups disposed in the transformer-core slot 1302, and, by way of the respective conductors 1323, 1333, 1343, 1353, 1363, 1373, 1383 and 1393, through the respective 1.000, 0.940, 0.766, 0.500, 0.174, 0.174, 0.500 and 0.766 conductor groups disposed in the transformer-core slot 1303, to the respective line conductors 1324, 1334, 1344, 1354, 1364, 1374, 1384 and 1394.

In Fig. 1, as in Figs. 2, 3 and 7, the conductors of the conductor groups that are associated with angular values between 0 and $\pi$ or 180 degrees, and, therefore, with positive values of the sine, are wound in the positive direction, down through the respective transformer-core slots. The conductor groups, the conductors of which are wound in this positive direction, are the 0.766, 0.500 and 0.174 conductor groups of the respective sinusoidally distributed phase windings 1g, 2g and 3g disposed in the transformer-core slot 1301, all the conductor groups disposed in the transformer-core slot 1302, and the 0.174, 0.500 and 0.766 conductor groups of the respective sinusoidally distributed phase windings 7g, 8g and 9g disposed in the transformer-core slot 1303. The remaining conductor groups of Fig. 1 are associated with angular values between $\pi$ or 180 degrees and $2\pi$ or 360 degrees, and, therefore, with negative values of the sine. The conductors of these remaining conductor groups are accordingly wound in the negative direction, up through the respective transformer-core slots.

The series phase-winding circuits of the sinusoidally distributed phase windings 1h to 9h of Fig. 4 are shown extending from the line conductors 1511, 1521, 1531, 1541, 1551, 1561, 1571, 1581 and 1591, through the respective 0.985, 0.866, 0.643, 0.342, 0.000, 0.342, 0.643, 0.866 and 0.985 conductor groups disposed in the transformer-core slot 1304. The direction of winding of the conductors of the 0.985, 0.866, 0.643 and 0.342 conductor groups of the sinusoidally distributed phase windings 1h to 4h is positive, and the direction of winding of the conductors of the 0.342, 0.643, 0.866 and 0.985 conductor groups of the sinusoidally distributed phase windings 6h to 9h is negative, as required by the sign of the respective sine values.

From these conductor groups, the phase-winding circuits of the sinusoidally distributed phase windings in 1h to 9h of Fig. 4 respectively continue, by way of the respective conductors 1512, 1522, 1532, 1542, 1552, 1562, 1572, 1582, and 1592, through the 0.174, 0.500, 0.766, 0.940, 1.000, 0.940, 0.766, 0.500 and 0.174 conductor groups disposed in the transformer-core slot 1305, to the respective line conductors 1513, 1523, 1533, 1543, 1553, 1563, 1573, 1583 and 1593.

It will be assumed, for the present, that the polyphase winding comprising the sinusoidally distributed phase windings 1g to 9g of Fig. 1 and the polyphase winding comprising the sinusoidally distributed phase windings 1h to 9h of Fig. 4 are the primary windings, and that the polyphase winding comprising the individual concentrated phase 1, phase 2 and phase 3 windings of Fig. 1 and the polyphase winding comprising the individual concentrated phase 1 and phase 2 windings of Fig. 4 are the secondary windings. It will also be assumed that the currents in the sinusoidally distributed phase windings 1g to 9g of Fig. 1 and 1h to 9h of Fig. 4 are respectively of the same peak amplitude and the same wave form, and that they are equally phase-displaced over a total range of phase displacement of $\pi$ or 180 electric degrees.

The unit magnetomotive forces of the currents through the phase windings 1g to 9g of Fig. 1 will be referred to by the respective symbols $f_1'$ to $f_9'$, the prime mark indicating that these unit magnetomotive forces are non-sinusoidal.

The alternating component magnetomotive force produced by the current through each conductor group of a sinusoidally distributed phase winding is then equal to the product of the unit magnetomotive force corresponding to that sinusoidally distributed phase winding, multiplied by the sine of the angle associated with that conductor group.

The non-sinusoidal component magnetomotive forces $F_1'$ to $F_9'$ of the currents of the phase windings 1g to 9g of Fig. 1 in the transformer-core slot 1302 will add to produce a resultant or composite alternating magnetomotive force $F_R'$:

$$F_R' = F_1' + F_2' + F_3' + F_4' + F_5' + F_6' + F_7' + F_8' + F_9' \quad (6)$$

or $$F_R' = f_1' \sin 170° + f_2' \sin 150° + f_3' \sin 130° + \ldots + f_9' \sin 10°$$

Substituting for the angles in this equation their respective supplementary angles, the equation becomes:

$$F_R' = f_1' \sin 10° + f_2' \sin 30° + f_3' \sin 50° + \ldots + f_9' \sin 170° \quad (7)$$

These two Equations 6 and 7, of course, are the same as the respective Equations 1 and 2, but they represent magnetic, instead of electric, potentials.

By analysis similar to that above relating to the component voltages, therefore, it may be shown that substantially all of the harmonics of the non-sinusoidal component magnetomotive forces cancel, and that the remaining magnetomotive forces add to produce a composite magnetomotive force that is substantially sinusoidal. Similar considerations apply in the case of the magnetomotive forces contributed to the transformer-core slot 1305 of Fig. 4.

In the other transformer-core slots 1301 and 1303 of Fig. 1 and 1304 of Fig. 4, a similar cancellation of harmonics occurs, but displaced in phase to correspond to the phase displacement of the respective transformer cores, or the corresponding individual concentrated phase windings.

Substantially the same results are thus obtained with the transformer system of Figs. 1 and 4, as with the transformer system of Figs. 2, 3 and 7, despite the fact that the harmonics are cancelled as magnetomotive forces, rather than as induced voltages. To cancel the 5th and other higher harmonics, the transformer system of Figs. 1 and 4 should be provided with four or more sinusoidally distributed phase windings, rather than four or more individual or concentrated windings, as provided in the transformer system of Figs. 2, 3 and 7. To accomplish this object of the present invention, therefore, regardless of which transformer system is used, one of the polyphase windings should be provided with four or more phase windings, and that polyphase winding should be connected to the non-sinusoidal polyphase electric system.

In view of the substantial cancellation of the harmonics, the operation of the transformer systems of Figs. 1 and 4 is substantially the same as when sinusoidal, rather than non-sinusoidal, currents flow through the various sinusoidally distributed phase windings. This operation of the sinusoidally distributed phase windings was previously discussed in connection with the description of Figs. 2, 3 and 7.

From a theoretical viewpoint, the transformer systems of Figs. 1 to 4 and 7 are alike. An apparent difference in their function arises only because of the different numbers of magnetic circuits and of primary and secondary phase windings involved. When the number of phase windings of the sinusoidally distributed polyphase winding is large, more harmonics of the induced component magnetomotive forces become cancelled; whereas, when the number of magnetic circuits is large, more harmonics of the component voltages become cancelled. When both the number of phase windings of the sinusoidally distributed polyphase winding and the number of magnetic circuits is large, then more harmonics of both the component magnetomotive forces and the component voltages become cancelled.

In all the transformer systems heretofore described, when the polyphase winding comprising the individual concentrated windings is operated as the primary winding, the harmonics introduced by the magnetizable cores appear, as in present-day transformers, in the primary currents. On the other hand, when the sinusoidally distributed polyphase winding is operated as the primary winding, harmonics introduced by the magnetizable cores appear in the alternating magnetic fluxes and in the secondary voltages and currents. In the latter case, the cancellation of the induced-voltage and the primary-current-magnetomotive-force harmonics precludes the flow of the harmonic currents required for the sinusoidal excitation of the magnetizable cores and for the induction of sinusoidal secondary voltages. Under load conditions, sufficient harmonic currents flow through the secondary circuits to effect substantially sinusoidal energization of the magnetizable cores. These harmonic currents approach a fixed amplitude, and they therefore become a decreased portion of the total secondary current as the load upon the transformer system is increased.

In present-day practice, it is preferred that no harmonics appear in the secondary circuits. In most applications of the transformer systems of Figs. 1, 2, 3, 4, 7, 9, 10 and 11, therefore, the polyphase winding comprising the individual concentrated windings may constitute the primary winding, and the sinusoidally distributed polyphase winding may thereupon constitute the secondary winding.

Not only is it possible to supply, by means of the transformer system of Figs. 1 and 4, many-phased voltages to a load of a corresponding large number of phases, but it is possible also to effect cancellation of harmonics introduced by the load itself, particularly if the load is an induction machine.

When the primary element of an induction machine is provided with a distributed polyphase winding, particularly a sinusoidally distributed polyphase winding, the flow of the harmonic currents required for the excitation of the induction-machine core are either blocked or restricted by the said distributed polyphase winding. Excitation harmonics accordingly appear in the alternating magnetic fluxes produced in the core of the induction machine and in the voltages induced in the individual conductors of the primary-element and secondary-element windings. If, on the other hand, the primary element of the induction machine is provided with individual concentrated windings, and sinusoidal voltages are impressed upon these windings by means of the transformer system of the present invention, the excitation harmonics then appear in the currents supplied to the induction machine, rather than in the induction machine itself. Furthermore, these harmonics cancel in the sinusoidally distributed polyphase secondary winding of the transformer system, and therefore do not appear in the currents supplied to the individual concentrated primary windings of the transformer system.

The fact that the sinusoidally distributed polyphase winding may be used either as a primary or a secondary winding leads to a further modification, shown in Fig. 5, wherein the transformer system of the present invention is provided with a primary and a secondary polyphase winding each comprising a plurality of sinusoidally distributed phase windings, the plurality of sinusoidally distributed phase windings of one of the polyphase windings being four or more.

In Fig. 5 as in Fig. 4, the transformer system of the present invention is shown provided with two transformer cores 1404 and 1405 and a primary polyphase winding comprising the sinusoidally distributed phase windings 1h to 9h. The secondary polyphase winding, however, instead of comprising individual concentrated windings, as in Fig. 4, is shown identically of the same type as the primary polyphase winding. However, in a practical machine, these primary and secondary polyphase windings of Fig. 5 need not be identical; they may be provided with different numbers of phase windings distributed with respect to different reference lines and corresponding different reference phases.

Transformer systems having magnetic systems comprising single-unit core structures are also within the scope of the invention. In Figs. 9 and 10, for example, the separate transformer cores 901 to 918 of Fig. 3 are replaced by a combined single unitary core structure 547. The transformer-core slots 1 to 18 are shown provided in this unitary core structure 547 in the same circular arrangement as in Fig. 3, and they are shown separated by individual transformer-core sections, teeth or legs 41 to 58.

The individual concentrated windings 1d to 18d of Fig. 3 are shown in Figs. 9 and 10 each wound around a peripheral portion of the magnetizable core 547 adjacent to the transformer-core slot in which the particular winding is disposed. Only a single sinusoidally distributed winding, which may be regarded as the phase 1 winding, is illustrated in Figs. 9 and 10; in section in Fig. 9 and elevation in Fig. 10. The other sinusoidally distributed winding or windings of a polyphase arrangement are omitted from these two Figs. 9 and 10, for clarity.

In Fig. 10, continuous or endless coils or windings, marked 0.174, 0.500, 0.766, 0.940, 1.000, 0.940, 0.766, 0.500 and 0.174, are shown respectively disposed in the pairs of transformer-core slots 1 and 18, 2 and 17, 3 and 16, 4 and 15, 5 and 14, 6 and 13, 7 and 12, 8 and 11 and 9 and 10. These transformer-winding coils are shown in Fig. 10 connected into a series distributed phase-winding circuit, extending from the line conductor 92, through the various conductor groups and the various intermediately disposed conductors 241 to 248, to the line conductor 104. The direction of winding is in all cases downward, in the direction of the respective arrows, through the positive collection of transformer-core slots 1 to 9, and upward through the negative collection of transformer-core slots 10 to 18.

In the transformer system of Figs. 9 and 10, the alternating magnetic fluxes produced by the resultant magnetomotive forces, instead of being separate, as in Fig. 3, combine in the single unitary magnetizable core 547. The resultant magnetic flux is illustrated by dashed lines in Fig. 9 for the instant of time when the current through the transformer-core slots 5 and 14 is at its maximum value. Progressing along in the electric cycle, at later instants of time, the above magnetic-flux distribution will be reproduced at positions geometrically displaced counterclockwise an amount equal to the electric angle through which the cycle is advanced. The alternating magnetic flux produced by the current in each of the primary windings 1d to 18d is stationary but, when all the alternating magnetic fluxes are thus superposed in the common magnetic circuit of the transformer core 547, the resultant magnetic flux actually rotates.

The alternating magnetic fluxes encircling the transformer-core slots 1 to 18 of Figs. 9 and 10, like the alternating magnetic fluxes encircling the transformer-core slots 1 to 18 of Fig. 3, are equally phase-displaced, of the same peak amplitude and of the same sinusoidal or non-sinusoidal wave form. It follows, therefore, that the above description pertaining to the sinusoidally distributed polyphase winding of Fig. 3 applies also to the sinusoidally distributed polyphase winding of Figs. 9 and 10.

Further modifications will occur to persons skilled in the art, and all such are intended to be included within the spirit and the scope of the invention, as defined in the appended claims.

What is claimed is:

1. A polyphase transformer system having, in combination, means for producing a magnetic system, comprising an assembly of one or more collections each of substantially the same number of magnetic circuits, primary and secondary polyphase windings each having a plurality of phase windings, the plurality of phase windings of one of the polyphase windings being four or more, the phase windings of one of the polyphase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the conductor groups of the respective phase windings being connected in series, and means cooperating with the other polyphase winding to produce substantially like magnetomotive forces in the magnetic circuits, the magnetomotive forces being substantially equally phase-displaced over the said total range.

2. A polyphase transformer system having, in combination, means for producing a magnetic system, comprising an assembly of one or more collections each of substantially the same number of magnetic circuits, primary and secondary polyphase windings each having a plurality of phase windings, the plurality of phase windings of one of the polyphase windings being four or more, the phase windings of one of the polyphase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of windings, and means cooperating with the other polyphase winding to produce substantially like magnetomotive forces in the magnetic circuits, the magnetomotive forces being substantially equally phase-displaced over the said total range.

3. A polyphase transformer system having, in combination, means for producing a magnetic system of substantially equiangularly spaced magnetic circuits, comprising an assembly of one or more collections each of substantially the same number of magnetic circuits, primary and secondary polyphase windings each having a plurality of phase windings, the plurality of phase windings of one of the polyphase windings being four or more, the phase windings of one of the polyphase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said direction of winding, and means cooperating with the other polyphase winding to produce substantially like magnetomotive forces in the magnetic circuits, the magnetomotive forces being substantially equally phase-displaced over the said total range.

4. A polyphase transformer system having, in combination, magnetizable-core means provided with an assembly of one or more collections each of substantially the same number of slots, primary and secondary polyphase windings each having a plurality of phase windings, the plurality of phase windings of one of the polyphase windings being four or more, the phase windings of one of the polyphase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, and means cooperating with the other polyphase winding to produce substantially like magnetomotive forces in the magnetic circuits surrounding the slots, the magnetomotive forces being substantially equally phase-displaced over the said total range.

5. A polyphase transformer system having, in combination, an assembly of one or more collections each of substantially the same number of magnetizable cores each provided with a slot, primary and secondary polyphase windings each having a plurality of phase windings, the plurality of phase windings of one of the polyphase windings being four or more, the phase windings of one of the polyphase windings each having a number of conductor groups substantially equal to the number of magnetizable cores of the assembly of magnetizable cores, a conductor group of each phase winding being disposed substantially in each slot, the numbers of conductors of the conductor groups of each phase winding varying substantially as the absolute values of the sine over a total range of substantially equal to 180 degrees multiplied by the number of collections of magnetizable cores at angular increments each substantially equal to the said total range divided by the number of cores, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, and means cooperating with the other polyphase winding to produce substantially like magnetomotive forces in the magnetic circuits surrounding the slots, the magnetomotive forces being substantially equally phase-displaced over the said total range.

6. A polyphase transformer system for connection to primary and secondary polyphase electric systems each having a plurality of phases, the plurality of phases of one of the polyphase electric systems being four or more, the transformer system having, in combination, means for producing a magnetic system comprising an assembly of one or more collections each of substantially the same number of magnetic circuits, means for supplying a component magnetomotive force from and corresponding to each phase of one polyphase electric system to, and inducing a component voltage for and corresponding to each phase of the said one polyphase electric system in each magnetic circuit of the assembly of magnetic circuits, the peak amplitudes of the component magnetomotive forces and the component voltages corresponding to the respective phases of the said one polyphase electric system being substantially proportional to the absolute values of the sine over a total range substantially equal to 180 degress multiplied by the number of collections of magnetic circuits at angular increments each substantially equal to the said total range divided by the number of magnetic circuits, the respective total ranges being displaced with respect to one another an angular amount substantially equal to the phase displacement of the phases of the said one polyphase electric system, the polarities of the component magnetomotive forces and the component voltages corresponding to each phase of the said one polyphase electric system changing with the sign of the said sine, means for combining the component voltages, in the said polarities, into composite voltages, one corresponding to each phase of the polyphase electric system, and means cooperating with the other polyphase winding to produce substantially like magnetomotive forces in the magnetic circuits, the magnetomotive forces being substantially equally phase-displaced over the said total range.

7. A polyphase transformer system having, in combination, magnetizable-core means provided with an assembly of one or more collections each of substantially the same number of slots substantially equiangularly spaced along the circumference of a circle, primary and secondary polyphase windings each having a plurality of phase windings, the plurality of phase windings of one of the polyphase windings being four or more, the phase windings of one of the polyphase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, and means cooperating with the other polyphase winding to produce substantially like magnetomotive forces in the magnetic circuits surrounding the slots, the magnetomotive forces being substantially equally phase-displaced over the said total range.

8. A polyphase transformer system having, in combination, means for producing a magnetic system comprising an assembly of one or more collections each of substantially the same number of magnetic circuits, primary and secondary polyphase windings each having a plurality of phase windings, the plurality of phase windings of one of the polyphase windings being four or more, the phase windings of one of the polyphase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, the other polyphase winding comprising a plurality of substantially like phase windings wound through the magnetic circuits, and means cooperating with the said other polyphase winding to produce substantially like magnetomotive forces in the magnetic circuits, the magnetomotive forces being substantially equally phase-displaced over the said total range.

9. A polyphase transformer system having, in combination, means for producing a magnetic system comprising an assembly of one or more collections each of substantially the same number of magnetic circuits, primary and secondary polyphase windings each having a plurality of phase windings, the plurality of phase windings of one of the polyphase windings being four or more, the phase windings of each polyphase winding each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges of the respective polyphase windings being displaced with respect to one another respective angular amounts substantially equal to the phase displacement of the phases of the respective polyphase windings, the directions of winding of the conductors of the conductor groups of each phase winding changing with the sign of the said sine, and the conductor groups of the respective phase windings being connected in series along the said directions of winding.

10. A polyphase transformer system having, in combination, a magnetizable core provided with an assembly of one or more collections each of substantially the same number of slots, primary and secondary polyphase windings each having a plurality of phase windings, the plurality of phase windings of one of the polyphase windings being four or more, the phase windings of one of the polyphase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces in the magnetic circuits surrounding the slots, the magnetomotive forces being substantially equally phase-displaced over the said total range.

11. A polyphase transformer system having in combination, a magnetizable core provided with an assembly of one or more collections each of substantially the same number of slots, primary and secondary polyphase windings each having a plurality of phase windings, the plurality of phase windings of one of the polyphase windings being four or more, the phase windings of each polyphase winding each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges of the respective polyphase windings being displaced with respect to one another respective angular amounts substantially equal to the phase displacement of the phases of the respective polyphase windings, the directions of winding of the conductors of the conductor groups of each phase winding changing with the sign of the said sine, and the conductor groups of the respective phase windings being connected in series along the said directions of winding.

12. A polyphase transformer system having, in combination, a magnetizable core provided with an assembly of one or more collections each of substantially the same number of slots substantially equiangularly spaced along the circumference of a circle, primary and secondary polyphase windings each having a plurality of phase windings, the plurality of phase windings of one of the polyphase windings being four or more, the phase windings of one of the polyphase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces in the magnetic circuits surrounding the slots, the magnetomotive forces being substantially equally phase-displaced over the said total range.

13. A polyphase transformer system having, in combination, a magnetizable core provided with an assembly of one or more collections each of substantially the same number of slots substantially equiangularly spaced along the circumference of a circle, primary and secondary polyphase windings each having a plurality of phase windings, the plurality of phase windings of one of the polyphase windings being four or more, the phase windings of each polyphase winding each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each susbtantially equal to the said total range divided by the number of slots, the respective total ranges of the respective polyphase windings being displaced with respect to one another respective angular amounts substantially equal to the phase displacement of the phases of the respective polyphase windings, the directions of winding of the conductors of the conductor groups of each phase winding changing with the sign of the said sine, and the conductor groups of the respective phase windings being connected in series along the said directions of winding.

14. A polyphase transformer system for connection to primary and secondary polyphase electric systems each having a plurality of phases, the plurality of phases of one of the polyphase electric systems being four or more, the transformer system having, in combination, means for producing a magnetic system comprising an assembly of one or more collections each of substantially the same number of magnetic circuits, means for supplying a component magnetomotive force from and corresponding to each phase of each polyphase electric system to, and inducing a component voltage for and corresponding to each phase of each polyphase electric system in each magnetic circuit of the assembly of magnetic circuits, the peak amplitudes of the component magnetomotive forces and the component voltages corresponding to the respective phases of each polyphase electric system being substantially proportional to the absolute values of the sine over a total range substantially equal to 180 degrees multiplied by the number of collections of magnetic circuits at angular increments each substantially equal to the said total range divided by the number of magnetic circuits, the respective total ranges corresponding to the respective polyphase electric systems being displaced with respect to one another respective angular amounts substantially equal to the phase displacement of the phases of the respective polyphase electric systems, the polarities of the component magnetomotive forces and the component voltages corresponding to each phase of each of the respective polyphase electric systems changing with the sign of the said sine, and means for combining the component voltages, in the said polarities, into composite voltages, one corresponding to each phase of each of the respective polyphase electric systems.

15. A polyphase transformer system having, in combination, an assembly of one or more collections each of substantially the same number of magnetizable cores each having a slot, primary and secondary polyphase windings each having a plurality of phase windings, the plurality of phase windings of one of the polyphase windings being four or more, the phase windings of one polyphase winding each having a number of conductor groups substantially equal to the number of magnetizable cores of the assembly of magnetizable cores, a conductor group of each phase winding being disposed substantially in each slot, the numbers of conductors of the conductor groups of each phase winding varying substantially as the absolute values of the sine over a total range substantially equal to 180 degrees multiplied by the number of collections of magnetizable cores at angular increments each substantially equal to the said total range divided by the number of magnetizable cores, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces in the magnetic circuits, the magnetomotive forces being substantially equally phase-displaced over the said total range.

16. A polyphase transformer system having, in combination, an assembly of one or more collections each of substantially the same number of magnetizable cores each having a slot, primary and secondary polyphase windings each having a plurality of phase windings, the plurality of phase windings of one of the polyphase windings being four or more, the phase windings of each polyphase winding each having a number of conductor groups substantially equal to the number of magnetizable cores of the assembly of magnetizable cores, a conductor group of each phase winding being disposed substantially in each slot, the numbers of conductors of the conductor groups of each phase winding varying substantially as the absolute values of the sine over a total range substantially equal to 180 degrees multiplied by the number of collections of magnetizable cores at angular increments each substantially equal to the said total range divided by the number of magnetizable cores, the respective total ranges of the respective polyphase windings being displaced with respect to one another respective angular amounts substantially equal to the phase displacement of the phases of the respective polyphase windings, the directions of winding of the conductors of the conductor groups of each phase winding changing with the sign of the said sine, and the conductor groups of the respective phase windings being connected in series along the said directions of winding.

17. A polyphase transformer system having, in combination, an assembly of three magnetizable cores each having a slot, primary and secondary polyphase windings one having four or more phase windings, the phase windings of the said one polyphase winding each having substantially three conductor groups, a conductor group of each phase winding being disposed substantially in each slot, the numbers of conductors of the conductor groups of each phase winding varying substantially as the absolute values of the sine over a total range of 360 degrees at angular increments each substantially equal to 120 degrees, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, the other polyphase winding comprising substantially like phase windings one wound through each slot, and means cooperating with the said other polyphase winding to produce substantially like magnetomotive forces in the magnetic circuits, the magnetomotive forces being substantially equally phase-displaced over the said total range.

18. A polyphase transformer system having, in combination, an assembly of two magnetizable cores each having a slot, primary and secondary polyphase windings one having four or more phase windings, the phase windings of the said one polyphase winding each having substantially two conductor groups, a conductor group of each phase winding being disposed substantially in each slot, the numbers of conductors of the conductor groups of each phase winding varying substantially as the absolute values of the sine over a total range of 180 degrees at angular increments each substantially equal to 90 degrees, the respective total ranges being displaced with respect to one another an angular amount substantially equal to the phase displacement of the phase windings, the directions of winding of the conductors of the conductor groups of each phase winding changing with the sign of the said sine, the conductor groups of the respective phase windings being connected in series along the said directions of winding, and the other polyphase winding comprising substantially like phase windings one wound through each slot, and means cooperating with the said other polyphase winding to produce substantially like magnetomotive forces in the magnetic circuits, the magnetomotive forces being substantially equally phase-displaced over the said total range.

19. A polyphase transformer system having, in combination, means for producing a magnetic system comprising an assembly of one or more collections each of substantially the same number of magnetic circuits, primary and secondary polyphase windings each having a plurality of phase windings, the plurality of phase windings of one of the polyphase windings being four or more, the phase windings of one of the polyphase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the conductor groups of the respective phase windings being connected in series, and means cooperating with the other polyphase winding to produce substantially like magnetomotive forces in the magnetic circuits, the magnetomotive forces being substantially equally phase-displaced over the said total range.

20. A polyphase transformer system having, in combination, magnetizable-core means provided with an assembly of one or more collections each of substantially the same number of slots, primary and secondary polyphase windings each having a plurality of phase windings, the plurality of phase windings of one of the polyphase windings being four or more, the phase windings of one of the polyphase windings each having a number of conductor groups substantially equal to the number of slots of the assembly of slots, a conductor group of each phase winding being disposed substantially in each slot, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing with the sign of the said alternating function, the conductor groups of the respective phase windings being connected in series along the said directions of winding, and means cooperating with the other polyphase winding to produce substantially like magnetomotive forces in the magnetic circuits surrounding the slots, the magnetomotive forces being substantially equally phase-displaced over the said total range.

21. A polyphase transformer system having, in combination, an assembly of one or more collections each of substantially the same number of magnetizable cores each having a slot, primary and secondary polyphase windings each having a plurality of phase windings, the plurality of phase windings of one of the polyphase windings being four or more, the phase windings of one polyphase winding each having a number of conductor groups substantially equal to the number of magnetizable cores of the assembly of magnetizable cores, a conductor group of each phase winding being disposed substantially in each slot, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of magnetizable cores at angular increments each substantially equal to the said total range divided by the number of magnetizable cores, the respective total ranges being displaced with respect to one another an angular amount substantially equal to the phase displacement of the phase windings, the directions of winding of the conductors of the conductor groups of each phase winding changing with the sign of the said alternating function, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces in the magnetic circuits surrounding the slots, the magnetomotive forces being substantially equally phase-displaced over the said total range.

22. A polyphase transformer system having, in combination, an assembly of one or more collections each of substantially the same number of magnetizable cores each having a slot, primary and secondary polyphase windings each having a plurality of phase windings, the plurality of phase windings of one of the polyphase windings being four or more, the phase windings of each polyphase winding each having a number of conductor groups substantially equal to the number of magnetizable cores of the assembly of magnetizable cores, a conductor group of each phase winding being disposed substantially in each slot, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of magnetizable cores at angular increments each substantially equal to the said total range divided by the number of magnetizable cores, the respective total ranges of the respective polyphase windings being displaced with respect to one another respective angular amounts substantially equal to the phase displacement of the phases of the respective polyphase windings, the directions of winding of the conductors of the conductor groups of each phase winding changing with the sign of the said alternating function, and the conductor groups of the respective phase windings being connected in series along the said directions of winding.

References Cited in the file of this patent

UNITED STATES PATENTS

| | | |
|---|---|---|
| 644,553 | Hutin et al. | Feb. 27, 1900 |
| 1,698,283 | Steinmetz | Jan. 8, 1929 |